(12) United States Patent
Sethuraman et al.

(10) Patent No.: US 12,743,708 B2
(45) Date of Patent: Sep. 22, 2026

(54) DYNAMIC PRICING OF PRODUCTS IN E-COMMERCE USING ENSEMBLE OF CONTEXTUAL BANDITS

(71) Applicant: Tata Consultancy Services Limited, Mumbai (IN)

(72) Inventors: Srividhya Sethuraman, Chennai (IN); Uma Maheswari Govindaraju, Chennai (IN); Sharadha Ramanan, Chennai (IN); Sunny Kumar, Chennai (IN); Siddhesh Sunil Thombre, Chennai (IN); Vikash Patel, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 2 days.

(21) Appl. No.: 18/947,221

(22) Filed: Nov. 14, 2024

(65) Prior Publication Data

US 2025/0165999 A1 May 22, 2025

(30) Foreign Application Priority Data

Nov. 17, 2023 (IN) ............................ 202321078301

(51) Int. Cl.
*G06Q 30/0201* (2023.01)
*G06N 20/20* (2019.01)

(52) U.S. Cl.
CPC ......... *G06Q 30/0206* (2013.01); *G06N 20/20* (2019.01)

(58) Field of Classification Search
CPC ........................... G06Q 30/0206; G06N 20/20
See application file for complete search history.

(56) References Cited

U.S. PATENT DOCUMENTS

2019/0172082 A1* 6/2019 Ganti Mahapatruni . G06N 5/01
2021/0248517 A1* 8/2021 Soppin .................. G06N 20/20
2024/0202760 A1 6/2024 Sethuraman et al.

FOREIGN PATENT DOCUMENTS

CN 112073469 A 12/2020
IN 202221066850 11/2022

* cited by examiner

*Primary Examiner* — George Chen
*Assistant Examiner* — Duane N. Moore
(74) *Attorney, Agent, or Firm* — Finnegan, Henderson, Farabow, Garrett & Dunner, LLP

(57) ABSTRACT

The embodiments of the present disclosure herein address the unresolved problem of obtaining price recommendation not only for the immediate moment but also for a continuous period until a market-driven price trigger necessitates change. Embodiments herein provide a framework for dynamic pricing of one or more products in an e-commerce retail using at least one contextual Bandit (CB) technique. The framework provides an ensemble of contextual bandits for dynamic pricing in e-commerce. The framework amalgamates strengths of one or more CB models. The framework incorporates an ensemble layer to critically review immediate pricing suggestions, ensuring their long-term applicability, thereby balancing margin stability and customer satisfaction over time.

20 Claims, 13 Drawing Sheets

300

Receiving, via an input/output interface, an input data from two primary sources pertaining to a plurality of Stock Keeping Units (SKUs), wherein the input data from a first primary source is based on historical transactions, an inventory, a price master, an online click stream, and attributes of customers, and the second primary source includes dynamics of the e-commerce landscape — 302

Pre-processing, via one or more hardware processors, the received input data to obtain pre-processed input data, wherein the pre-processing includes removing one or more predefined outliers based on clipping technique, imputing missing values based on a moving average technique, and a dimensionality reduction based on principal component analysis — 304

Aggregating, via the one or more hardware processors, the obtained pre-processed input data to a predefined level of granularity to get an aggregated data using a set of clustering and segmentation techniques — 306

Enabling triggers, wherein the one or more triggers include a competitor price distance beyond a threshold, an inventory level below threshold, a predefined special event, holidays, competitor products go out of stock and a change in an input cost beyond a predefined threshold — 308

FIG. 3A

DYNAMIC PRICING OF PRODUCTS IN E-COMMERCE USING ENSEMBLE OF CONTEXTUAL BANDITS

PRIORITY CLAIM

This U.S. patent application claims priority under 35 U.S.C. § 119 to Indian Application number 202321078301, filed on Nov. 17, 2023. The entire content of the abovementioned application is incorporated herein by reference.

TECHNICAL FIELD

The disclosure herein generally relates to the field of e-commerce and more particularly, a method and system for dynamic pricing of one or more products in an e-commerce retail using at least one contextual bandit technique.

BACKGROUND

In a dynamically evolving landscape of e-commerce, pricing remains a pivotal concern for online retailers aiming to maximize revenue. Retailers face a set of real-world challenges for arriving at optimal prices for many products. These challenges range from pricing based on various triggers due to adaptive competitors pricing, evolving customer preferences, weather, competitor products going out of stock, changes in input cost and inflation. Other challenges include dealing with long-tail products that have sparse data, new products that have no historical sales information, fashion products that have very short lifetime and accounting for numerous Stock Keeping Units (SKUs) and segmented customer bases. Further challenges include pricing for inter-related products and for products to meet margin goals as well as price family constraints. The trigger could be every day, in real time or based on changes in competitor prices or market trends. The retailer must change price recommendations when one or more of these triggers are enabled. Further, the retailer must arrive at prices that maximize yield for the current time as well as for the cumulative time before a price change is triggered. Hence there is a need of providing price recommendations not only for the immediate moment but also for a continuous period until a market-driven price trigger necessitates change.

In other words, e-commerce sector is characterized by a fluid and rapidly evolving environment, where pricing strategies are central to a retailer's success. Dynamic pricing in e-commerce has garnered significant attention within research circles. Existing studies approach this subject from various angles, each contributing to the understanding of pricing mechanisms. In the state of the art, the focus is on understanding the unknown demand curve by treating buyer valuations as identical, random, and worst-case scenarios. Diverging from this, other leverages covariates as side information, utilizing a parametric demand model to extract more meaningful insights. Similarly, few researchers delineate dynamic pricing under two key paradigms: 1) fluctuating demand functions, and 2) static demand influenced by inventory levels.

SUMMARY

Embodiments of the present disclosure present technological improvements as solutions to one or more of the above-mentioned technical problems recognized by the inventors in conventional systems. For example, in one embodiment, a method for dynamic pricing of one or more products in an e-commerce retail using at least one contextual bandit technique is provided. The processor-implemented method comprising receiving, via an input/output interface, an input data from two primary sources pertaining to a plurality of Stock Keeping Units (SKUs). Wherein the input data from a first primary source is based on one or more historical transactions, an inventory, a price master, an online click stream, and one or more attributes of one or more customers and SKUs, and wherein the second primary source includes dynamics of the e-commerce landscape. Further the received input data is pre-processed to obtain a pre-processed input data, wherein the pre-processing includes removing one or more predefined outliers based on clipping technique, imputing missing values based on a moving average technique, and a dimensionality reduction based on principal component analysis and a combination of normalization and standardization techniques based on minimum and maximum value and one or more distribution characteristics of the input data. Furthermore, the obtained pre-processed input data is aggregated to a predefined level of granularity to get an aggregated data using a set of clustering and segmentation techniques.

Further, the processor-implemented method includes enabling at least one of one or more triggers, wherein the one or more triggers include a competitor price distance beyond a predefined threshold, an inventory level below threshold, a predefined special event, holidays, one or more competitor products going out of stock and a change in an input cost beyond a predefined threshold, obtaining a contextual data from the aggregated data based on the enabled one or more triggers for a price change, wherein the contextual data includes a plurality of contextual features comprising competitor price leakage ratio coefficients, cross price elasticity coefficients, customer clusters and seasonality indices and training one or more Contextual Bandit (CB) models based on the plurality of contextual features with the enabled one or more triggers to obtain a price recommendation corresponding to each of the one or more CB models wherein each of the one or more CB models are tweaked by employing an approximate inference, a caching, a model approximation and a sampling reduction to speed up computation of the CB model.

Furthermore, an optimal price recommendation is computed for each of the one or more CB models based on a predefined ensemble model to recommend at least one optimal price computed by on the predefined ensemble model, wherein the predefined ensemble model following one or more ensemble strategies. Wherein the predefined ensemble model calculates a cumulative reward, and wherein the cumulative reward is a combination of a current reward and a future reward corresponding to the time period until the next price change based on the price recommendation of each of the plurality of CB models. The one or more ensemble strategies includes assigning a weight to each of the one or more CB models based on predefined historical performance and using the assigned weights to aggregate prices, predicting a final price against proposed prices of each of the one or more CB models using a predefined advanced algorithmic learning technique and a voting mechanism. and continuously monitoring performance of the ensemble model to adjust weight and voting mechanisms to optimize performance.

In another embodiment, a system for dynamic pricing of one or more products in an e-commerce retail using at least one contextual bandit technique is provided. The system comprises a memory storing a plurality of instructions, one or more Input/Output (I/O) interfaces, and one or more hardware processors coupled to the memory via the one or more I/O interfaces. The one or more hardware processors are configured by the instructions to receive an input data from two primary sources pertaining to a plurality of Stock Keeping Units (SKUs), wherein the input data from a first primary source is based on one or more historical transactions, an inventory, a price master, an online click stream, and one or more attributes of one or more customers, and wherein the second primary source includes dynamics of the e-commerce landscape.

Further, the one or more hardware processors are configured by the instructions to pre-process the received input data to obtain pre-processed input data, wherein the pre-processing includes removing one or more predefined outliers based on clipping technique, imputing missing values based on a moving average technique, and a dimensionality reduction based on principal component analysis and a combination of normalization and standardization techniques based on minimum and maximum value and one or more distribution characteristics of the input data, aggregate the obtained pre-processed input data to a predefined level of granularity to get an aggregated data using a set of clustering and segmentation techniques, and enable at least one of one or more triggers, wherein the one or more triggers include a competitor price distance beyond a predefined threshold, an inventory level below threshold, a predefined special event, holidays, one or more competitor products go out of stock and a change in an input cost beyond a predefined threshold.

Furthermore, the one or more hardware processors are configured by the instructions to obtain a contextual data from the aggregated data based on the enabled one or more triggers for a price change, wherein the contextual data includes a plurality of contextual features comprising competitor price leakage ratio coefficients, cross price elasticity coefficients, customer clusters and seasonality indices, train one or more Contextual Bandit (CB) models based on the plurality of contextual features with the enabled one or more triggers to obtain a price recommendation corresponding to each of the one or more CB models—wherein each of the one or more CB models are tweaked by employing an approximate inference, a caching, a model approximation and a sampling reduction to speed up computation of the CB model.

Further, the one or more hardware processors are configured by the instructions to compute an optimal price recommendation of each of the one or more CB models based on a predefined ensemble model, wherein the predefined ensemble model calculates a cumulative reward, and wherein the cumulative reward is a combination of a current reward and a future reward corresponding to the time period until the next price change based on the price recommendation of each of the plurality of CB models and recommend at least one optimal price computed by on the predefined ensemble model, wherein the predefined ensemble model following ensemble strategies including assigning a weight to each of the one or more CB models based on predefined historical performance and using the assigned weights to aggregate prices, predict a final price against proposed prices of each of the one or more CB models using an advanced algorithmic learning technique and a voting mechanism and continuously monitoring performance of the ensemble model to adjust ensemble approach to optimize performance.

In yet another embodiment, there are provided one or more non-transitory machine-readable information storage mediums comprising one or more instructions, which when executed by one or more hardware processors causes a method for dynamic pricing of one or more products in an e-commerce retail using at least one contextual bandit technique is provided. The processor-implemented method comprising receiving, via an input/output interface, an input data from two primary sources pertaining to a plurality of Stock Keeping Units (SKUs), wherein the input data from a first primary source is based on one or more historical transactions, an inventory, a price master, an online click stream, and one or more attributes of one or more customers and SKUs, and wherein the second primary source includes dynamics of the e-commerce landscape. The received input data is pre-processed to obtain pre-processed input data, wherein the pre-processing includes removing one or more predefined outliers based on clipping technique, imputing missing values based on a moving average technique, and a dimensionality reduction based on principal component analysis and a combination of normalization and standardization techniques based on minimum and maximum value and one or more distribution characteristics of the input data. Further, the obtained pre-processed input data is aggregated to a predefined level of granularity to get an aggregated data using a set of clustering and segmentation techniques.

Further, the processor-implemented method includes enabling, via the one or more hardware processors, at least one of one or more triggers, wherein the one or more triggers include a competitor price distance beyond a predefined threshold, an inventory level below threshold, a predefined special event, holidays, one or more competitor products going out of stock and a change in an input cost beyond a predefined threshold, obtaining, via the one or more hardware processors, a contextual data from the aggregated data based on the enabled one or more triggers for a price change, wherein the contextual data includes a plurality of contextual features comprising competitor price leakage ratio coefficients, cross price elasticity coefficients, customer clusters and seasonality indices and training, via the one or more hardware processors, one or more Contextual Bandit (CB) models based on the plurality of contextual features with the enabled one or more triggers to obtain a price recommendation corresponding to each of the one or more CB models wherein each of the one or more CB models are tweaked by employing an approximate inference, a caching, a model approximation and a sampling reduction to speed up computation of the CB model.

Furthermore, an optimal price recommendation is computed for each of the one or more CB models based on a predefined ensemble model to recommend at least one optimal price computed by on the predefined ensemble model, wherein the predefined ensemble model following one or more ensemble strategies. Wherein the predefined ensemble model calculates a cumulative reward, and wherein the cumulative reward is a combination of a current reward and a future reward corresponding to the time period until the next price change based on the price recommendation of each of the plurality of CB models. The one or more ensemble strategies includes assigning a weight to each of the one or more CB models based on predefined historical performance and using the assigned weights to aggregate prices, predicting a final price against proposed prices of each of the one or more CB models using a predefined advanced algorithmic learning technique and a voting mechanism, and continuously monitoring performance of the ensemble model to adjust weight and voting mechanisms to optimize performance.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 3A and 3B is an exemplary flow diagram illustrating a processor-implemented method for dynamic pricing of one or more products in an e-commerce retail using at least one contextual bandit technique, according to some embodiments of the present disclosure.

DETAILED DESCRIPTION

Figure 1:
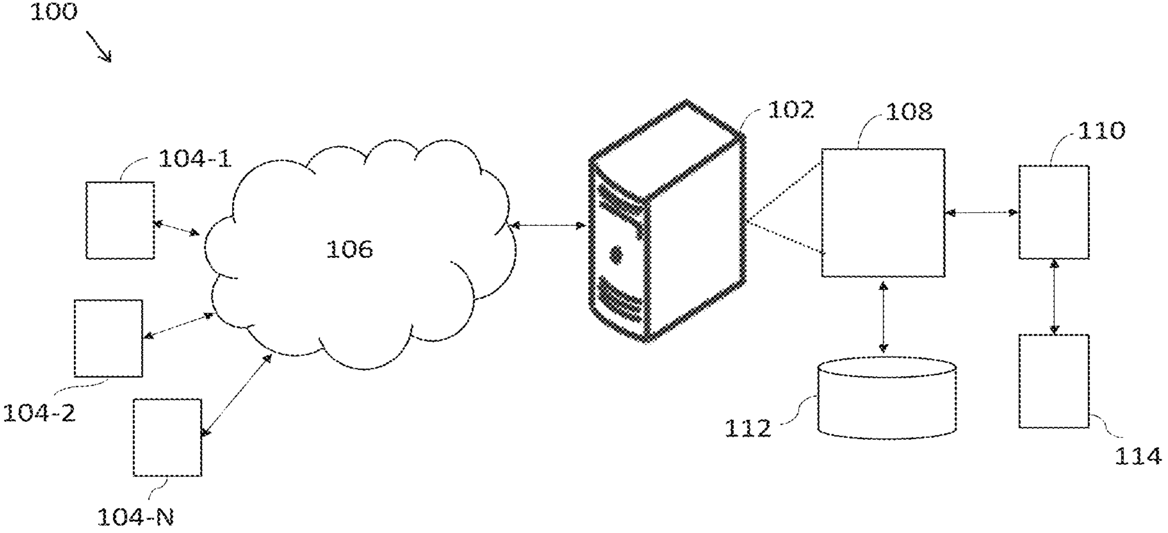
FIG. 1 illustrates a system for dynamic pricing of one or more products in an e-commerce retail using at least one contextual bandit technique, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

In a dynamically evolving landscape of e-commerce, pricing remains a pivotal concern for online retailers aiming to maximize revenue. Retailers faces a set of real-world challenges that for arriving at optimal prices for many products. These challenges range from pricing based on various triggers like competitor pricing and inflation, to dealing with long-tail products that have sparse data, and accounting for numerous Stock Keeping Units (SKUs) and segmented customer bases. The trigger could be every day, in real time or based on changes in competitor prices or market trends. The retailer must change price recommendations when one or more of these triggers are enabled. Further, the retailer must arrive at prices that maximize yield for the current time as well as for the cumulative time before a price change is triggered. Hence there is a need of providing price recommendations not only for the immediate moment but also for a continuous period until a market-driven price trigger necessitates change.

To address these nuanced complexities, the disclosure herein introduces an Ensemble of Contextual Bandits for Dynamic pricing in E-commerce (ENCODE), a groundbreaking ensemble-based Contextual Bandit (CB) model. ENCODE amalgamates strengths of various CB algorithms such as LinUCB (Linear Upper Confidence Bounds), Vowpal Wabbit, Contextual Thompson Sampling, and Bayes UCB. Uniquely, the ENCODE model goes a step further by incorporating an ensemble layer to critically review immediate pricing suggestions, ensuring their long-term applicability, thereby balancing margin stability and customer satisfaction over time.

In the ENCODE model, the CB algorithms actively adapt to these changing dynamics by assimilating contextual features and continuously evolving their price recommendations. Another noteworthy contribution is from, which investigates dynamic pricing for products with high-dimensional features, albeit without inventory constraints. In contrast, the disclosure recommends practical modifications that optimize computing resources. This differentiates the invention from other works on bandits with side-information such as those in, where free exploration is often employed. In the ENCODE model, the set of arms is finite and tied to a distinct set of prices, thus providing no additional information about the rewards of other arms when one is selected. Furthermore, the study proposes ellipsoid based dynamic pricing for highly differentiated products, assuming that product features predominantly drive market values. In contrast, the ENCODE model accounts for both product features and additional temporal factors that uniquely influence sales. Lastly, whereas studies explore the applicability of bandit policies in recommendation systems, the disclosure is relying upon employing an ensemble bandit specifically for dynamic pricing. Thus, the disclosure presents an innovative blend of ensemble modeling and CB algorithms, designed to address the intricate dynamics of real world e-commerce pricing.

Embodiments herein provide a method and system for dynamic pricing of one or more products in an e-commerce retail using at least one contextual bandit technique. The present disclosure overcomes the above mentioned challenges by introducing a comprehensive framework for dynamic pricing, grounded in robust data analytics and Machine Learning (ML) techniques. The framework integrates a multitude of data inputs including transaction, attribute, inventory, and price master data. These inputs not only encapsulate historical sales patterns but also feed into ML models, particularly XGBoost, for forecasting demand. Additionally, the input data incorporates item attributes, retail price, temporal features, and discount flags. It also synergizes with high-frequency market data to capture real-time e-commerce landscape features. This amalgamated data undergoes meticulous cleaning and preprocessing, which includes dimensionality reduction, feature extraction, and elimination. The data is then clustered and aggregated as per business-specific requirements.

The processed data activates at least one Contextual Bandit (CB) model, governed by predetermined triggers related to influential factors like competitor pricing and external trends. Once activated, an ensemble model supervises the price recommendations from one or more CB models. The ensemble model employs epsilon-greedy and Q-learning techniques, innovatively focusing on both immediate and future rewards, thereby ensuring optimal pricing. Additionally, the framework offers a unique "what-if" analysis capability to evaluate each of one or more CB model performance under various hypothetical scenarios. Thus, the framework is rooted in innovative data-driven models and algorithms, offering a multi-faceted, dynamic approach to e-commerce pricing.

Referring now to the drawings, and more particularly to FIG. 1 through FIG. 10, where similar reference characters denote corresponding features consistently throughout the figures, there are shown preferred embodiments, and these embodiments are described in the context of the following exemplary system and/or method.

FIG. 1 illustrates a block diagram of a system for dynamic pricing of one or more products in an e-commerce retail using at least one Contextual Bandit (CB) model, in accordance with an example embodiment. Although the present disclosure is explained considering that the system 100 is implemented on a server, it may be understood that the system 100 may comprise one or more computing devices 102, such as a laptop computer, a desktop computer, a notebook, a workstation, a cloud-based computing environment and the like. It will be understood that the system 100 may be accessed through one or more input/output interfaces 104-1, 104-2 . . . 104-N, collectively referred to as I/O interface 104. Examples of the I/O interface 104 may include, but are not limited to, a user interface, a portable computer, a personal digital assistant, a handheld device, a smartphone, a tablet computer, a workstation, and the like. The I/O interface 104 is communicatively coupled to the system 100 through a network 106.

In an embodiment, the network 106 may be a wireless or a wired network, or a combination thereof. In an example, the network 106 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 106 may include a variety of network devices, including routers, bridges, servers, computing devices, storage devices. The network devices within the network 106 may interact with the system 100 through communication links.

The system 100 supports various connectivity options such as BLUETOOTH®, USB, ZigBee, and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. Further, the system 100 comprises at least one memory 110 with a plurality of instructions, one or more databases 112, and one or more hardware processors 108 which are communicatively coupled with the at least one memory to execute a plurality of modules 114 therein. The components and functionalities of the system 100 are described further in detail.

Figure 2:
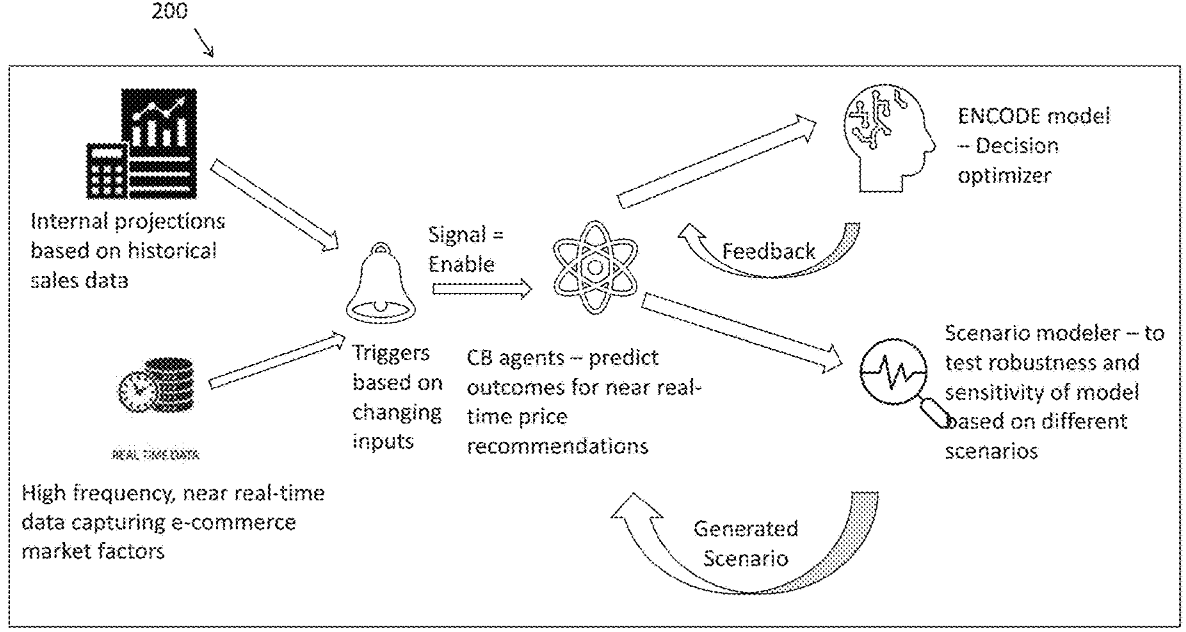
FIG. 2 is a functional block diagram to illustrate a system for dynamic pricing of one or more products in an e-commerce retail using at least one contextual bandit technique, according to some embodiments of the present disclosure.

FIG. 2 is a functional block diagram 200 to illustrate a framework for dynamic pricing grounded in robust data analytics and Machine Learning (ML) techniques, according to some embodiments of the present disclosure. In one embodiment, the system 100 is configured to consider both the immediate and future context. This is determined by an essential hyperparameter (batch size) that regulates an ensemble model. The framework facilitates decisions that are not only optimal in the current scenario but also extend their optimality over a future time frame, typically 2-3 weeks, aligning with the retailer's focus on stability and customer satisfaction. This foresight is provided by projections generated by a suite of ML and Deep Learning models, trained on historical data.

In one embodiment, the system 100 includes an online dynamic pricing model which makes use of four different CB models: LinUCB, Vowpal Wabbit (VW) mini-monster, Contextual Thompson Sampling (CTS), and Bayes UCB. These are compared against a baseline Sequential Least-Squares Programming (SLSQP) technique. Each CB model considers various context features, including product and customer attributes, to maximize a composite reward function that balances sales, revenue, and margin.

Further, the system 100 is configured to incorporate Thompson Sampling based models to compute price elasticity. Additionally, the input data incorporates item attributes, retail price, temporal features, and discount flags. It also synergizes with high-frequency market data to capture real-time e-commerce landscape features. This amalgamated data undergoes meticulous cleaning and preprocessing, which includes dimensionality reduction, feature extraction, and elimination. The data is then clustered and aggregated as per business-specific requirements. The pre-processed data activates at least one CB model, governed by predetermined triggers related to influential factors like competitor pricing and external trends. Once activated, an ensemble model supervises the price recommendations from the one or more CB models. The ensemble model employs epsilon-greedy and Q-learning techniques, innovatively focusing on both immediate and future rewards, thereby ensuring optimal pricing.

Figure 3B:
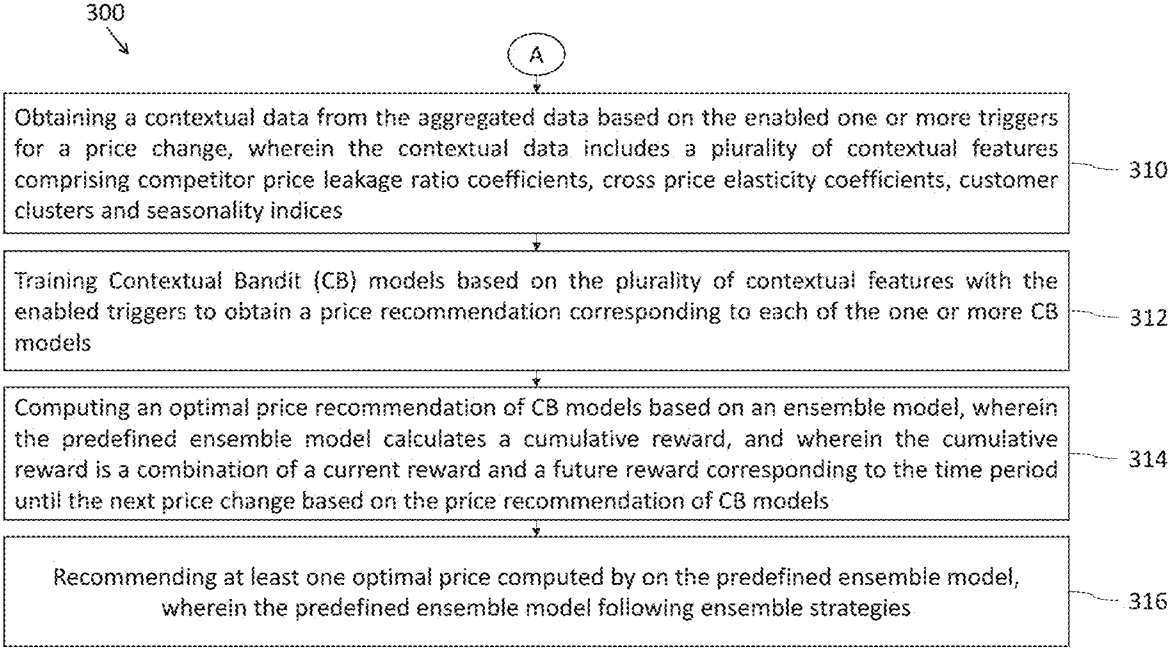

FIG. 3 is a flow diagram illustrating a processor-implemented method 300 for dynamic pricing of one or more products in an e-commerce retail using at least one contextual bandit technique implemented by system 100 of FIG. 1. Functions of the components of the system 100 of the framework are now explained through steps of flow diagram in FIG. 3, according to some embodiments of the present disclosure.

Initially, at step 302 of the processor-implemented method 300, the one or more hardware processors 108 are configured by the programmed instructions to receive, via an input/output interface, an input data from two primary sources pertaining to a plurality of Stock Keeping Units (SKUs). The input data from the first primary source is based on one or more historical transactions, an inventory, a price master, an online click stream, and one or more attributes of one or more customers. A second primary source includes dynamics of the e-commerce landscape. The one or more attributes of one or more customers are identified via a K-Means clustering technique based on one or more customer attributes data.

Figure 4:
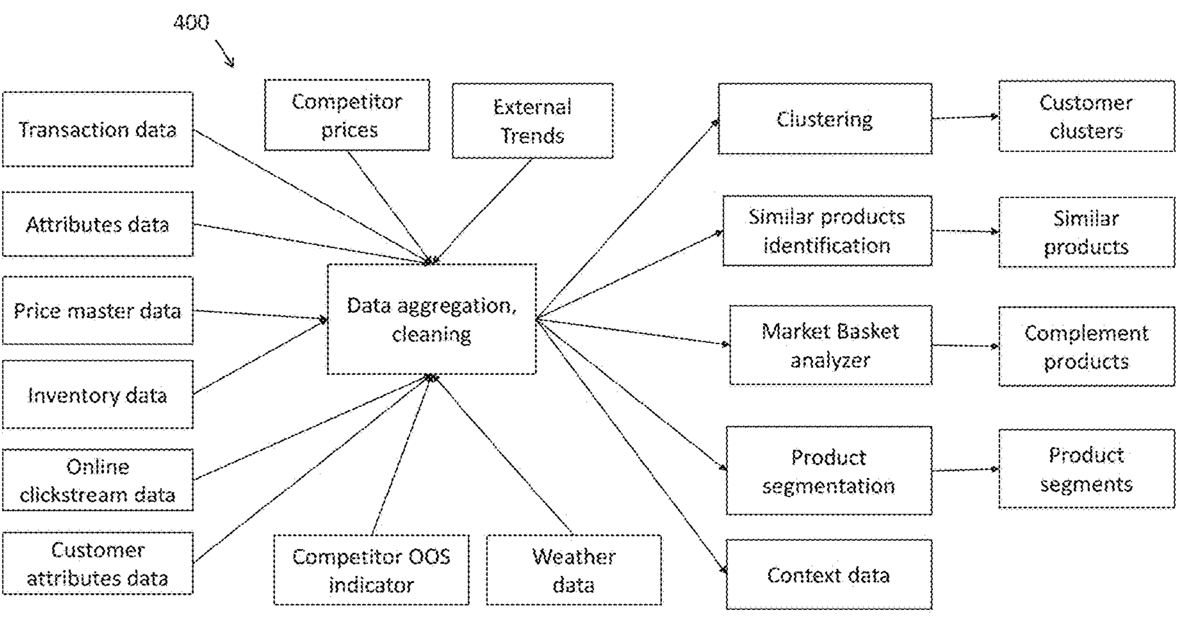
FIG. 4 is a block diagram to illustrate pre-processing and aggregation of input data, according to some embodiments of the present disclosure.

FIG. 4 is a block diagram 400 to illustrate pre-processing and aggregation of input data, according to some embodiments of the present disclosure. The data from various internal sources such as historical transaction data, attributes data, inventory data, price master data and customer attributes data, along with online clickstream data captured from previous sessions are sent to a pre-processing module. Real time data such as competitor prices, competitor out of stock (OOS) indicator, weather data and external trends are also passed to the pre-processing module. The pre-processing module of the system 100 is configured to clean data by inputting missing sales, removing outliers and irrelevant features and aggregates data at the desired level of granularity.

In one example, an infinite inventory (allowing replenishment) for a set of seasonal non-perishable products corresponding to a chosen dataset. Given a discrete time, horizon of T rounds, in each round t, the policy (representing the online retailer) selects a price $P_t$ within specified min-max bounds. The demand $D_t$ in this round is then independently drawn from a fixed distribution with unknown parameters. The average reward of the CB model at the end of the selling horizon for 'N' iterations and 'K' styles. Dynamic pricing can be modelled as a sequential decision process since the price of next round does not depend on previous rounds, given current price and price bounds. Hence, CB models are applicable for this problem. The objective is to maximize reward for each style. The only constraint that the pricing policy must satisfy is the price constraint which binds the prices selected between a minimum and a maximum price specified by the retailer.

Figure 5:
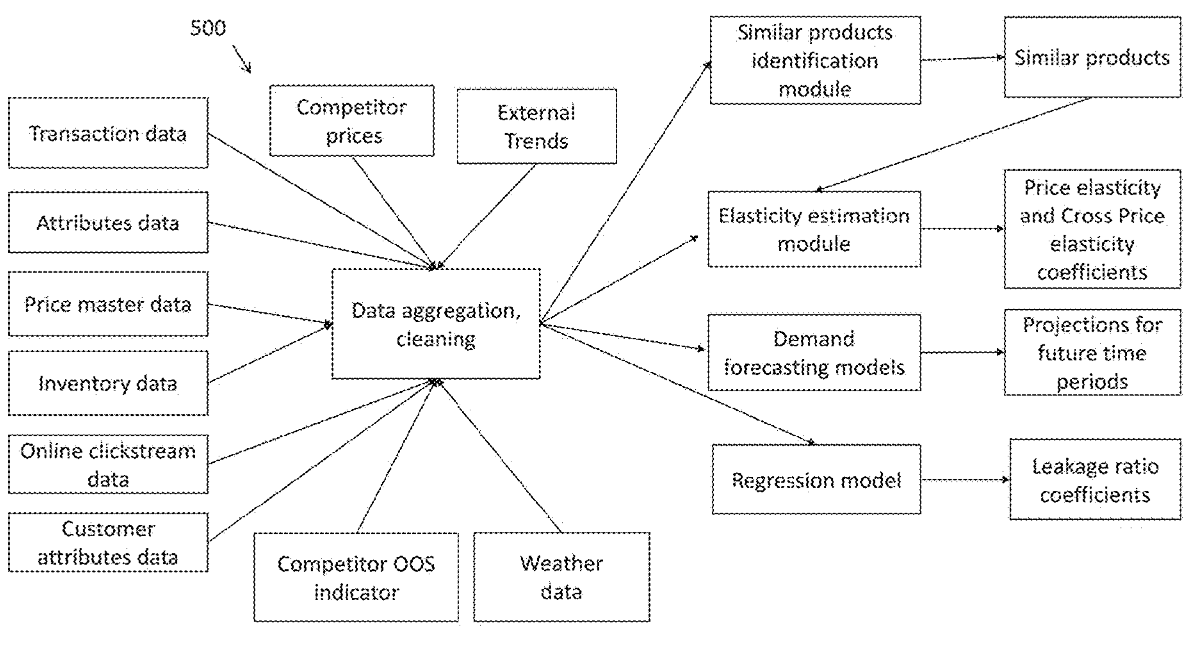
FIG. 5 is a block diagram to illustrate internal projection, according to some embodiments of the present disclosure.

FIG. 5 is a block diagram to illustrate internal projection, according to some embodiments of the present disclosure. One of the sources of data is based on internal projections, say demand forecasts for future time periods, price elasticity coefficients estimated based on the latest batch of data. The second source is the direct incoming feed of data coming from the live e-commerce site. The second source also captures the dynamics of the e-commerce landscape in the current time period such as competitor prices, weather, and inventory levels. The framework integrates a multitude of data inputs including transaction, attribute, inventory, and price master data. These inputs not only encapsulate historical sales patterns but also feed into ML models, particularly XGBoost, for forecasting demand.

At the next step 304 of the processor-implemented method 300, the one or more hardware processors 108 are configured by the programmed instructions to pre-process the received input data to obtain pre-processed input data. Herein, the pre-processing includes removing one or more predefined outliers based on clipping technique, imputing missing values based on a moving average technique, and a dimensionality reduction based on principal component analysis. For context dimensionality, a set of context features are considered that have had higher feature importance (based on Random Forest Regressor on the context data) thus eliminating irrelevant context variables that do not significantly impact reward. For example, ≈50% reduction in time compared to taking all original set of features.

At the next step 306 of the processor-implemented method 300, the one or more hardware processors 108 are configured by the programmed instructions to aggregate the obtained pre-processed input data to a predefined level of granularity to get an aggregated data using a set of clustering and segmentation techniques.

At the next step 308 of the processor-implemented method 300, the one or more hardware processors 108 are configured by the programmed instructions to enable at least one of one or more triggers for a price change. The one or more triggers include a competitor price distance beyond a predefined threshold, an inventory level below threshold, a predefined special event, holidays, one or more competitor products go out of stock and a change in an input cost. The system 100 enables triggers based on pre-defined thresholds, competitor price change percentage, inventory depletion rate and sudden fluctuations in weather conditions. If one or more of these triggers are enabled, the CB model agents run the price recommendation techniques based on the combined data that is a concatenated form of data arriving from the two primary sources. Each CB model is trained on historical sales data. The triggers are based on data flowing in real-time. The triggers are formed based on both the patterns learnt from historical data and the retailer's rules for responding to these triggers.

At the next step 310 of the processor-implemented method 300, the one or more hardware processors 108 are configured by the programmed instructions to obtain a contextual data from the aggregated data based on the enabled one or more triggers. The contextual data includes a plurality of contextual features comprising leakage ratio coefficients, cross price elasticity coefficients, customer clusters and seasonality indices. Once the combined data arrives, each of the one or more CB models produces a price recommendation. These price recommendations are overseen by an ensemble model (ENCODE), that selects one among the price recommendations suggested by each of the one or more CB models. The final price recommendation of the ensemble model is based on the reward associated with the current context and the reward for the projected context.

The cross price elasticity coefficients computation comprises selecting a key SKU among a plurality of SKUs by a user, identifying, via a K-Nearest Neighbours (KNN) model, one or more SKUs among the plurality of SKUs which are mapping to the selected key SKU, identifying, via a market basket analyser, co-bought product based on one or more association rule mining techniques, in the identified plurality of top SKUs, and performing regression against sales of the key SKUs based on prices of related products identified via the KNN model and the market basket analysis technique.

In another embodiment, wherein calculating leakage ratio coefficients corresponding to one or more competitor prices through a two-step regression. In the first step, all features affecting sales except the competitor price are regressed against sales and the residuals are captured. In the second step, the competitor prices are regressed against the residuals and the corresponding coefficients for each competitor price are taken as competitor leakage ratios.

In one embodiment, a Thompson Sampling based model is incorporated to compute a price elasticity. Additionally, the input data incorporates item attributes, retail price, temporal features, and discount flags. It also synergizes with high-frequency market data to capture real-time e-commerce landscape features. This amalgamated data undergoes meticulous cleaning and preprocessing, which includes dimensionality reduction, feature extraction, and elimination. The data is then clustered and aggregated as per business-specific requirements.

At the next step 312 of the processor-implemented method 300, the one or more hardware processors 108 are configured by the programmed instructions to train one or more CB models based on the plurality of contextual features with the enabled one or more triggers to obtain a price recommendation corresponding to each of the one or more CB models. It is to be noted that contextual bandit learning provides an option to exploit a current solution or to explore a new solution in order to identify a global optimal solution. Wherein the contextual bandit learning analyses context vectors to identify the global optimal solution.

The training of each of the plurality of CB models following below steps:

1. A plurality of contextual features with at least one of one or more enable triggers, predefined demand forecasts, price elasticity, and the plurality of SKUs are received.
2. Setting discrete prices for the SKUs between a predefined price range minimum and a predefined maximum price range.

$$\text{Maximize Yield} = \alpha_1 * \text{Sales} + \alpha_2 * \text{Revenue} + \alpha_3 * \text{Margin} \quad (1)$$

3. A reward function is calculated based on a yield equation (a weighted combination of sales, revenue, and margin).
4. A price arm is selected (maximum and minimum price range) iteratively by an exploration and exploitation strategy of the CB models.
5. Obtaining sales corresponding to the chosen price arm, and a yield is calculated based on the chosen price.
6. The reward function is updated corresponding to the chosen price based on the yield obtained.

Figure 6:
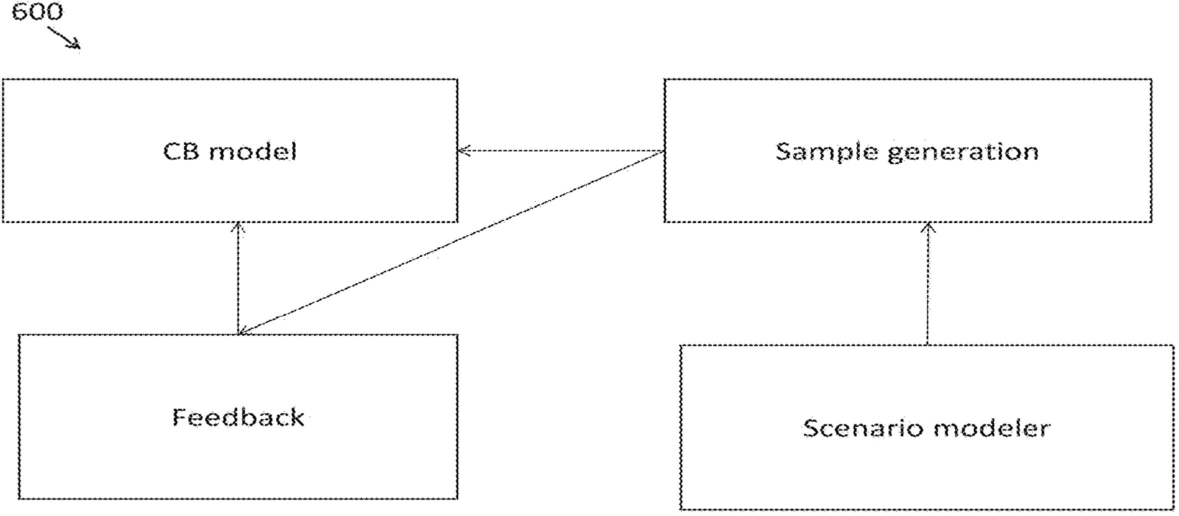
FIG. 6 is a block diagram to illustrate scenario modeler module, according to some embodiments of the present disclosure.

The contextual bandit for optimal pricing for LTP products in ecommerce. LTP products have infrequent sales and fluctuating demand patterns. Contextual Bandits based approach that continuously learns and adapts the pricing strategy based on the evolving market context. The approach consists of the following steps-Data collection, Feature engineering, i.e., identifying and creating features that influence pricing, including seasonality, product attributes, and customer behaviour, model development, policy implementation and a feedback loop as shown in FIG. 6.

In big data settings, where the number of arms (price points) and data points can be very large, making the CB models run efficiently is crucial. Here are some tweaks and strategies to make some of the CB models run faster in such settings.

Approximate Inference: One of the most time-consuming aspects of Contextual Thompson Sampling is posterior inference for each arm's distribution. Herein, approximate methods like variational Inference or Markov Chain Monte Carlo (MCMC) with fewer samples is used to speed up inference.

Caching: Caching previously computed values, such as posterior distributions for arms, can avoid recomputing them if the data does not change significantly. This can be particularly useful in situations where the data does not change rapidly.

Model Approximation: Simpler models or approximations are used for the arm distributions, such as Gaussian approximations for modelling posteriors, priors, and likelihoods.

Sampling Reduction: The number of samples used for Thompson Sampling is reduced for each arm. Instead of sampling a full distribution, point estimates (i.e., mean, or median of the posterior) are used to approximate the arm's value.

Figure 7:
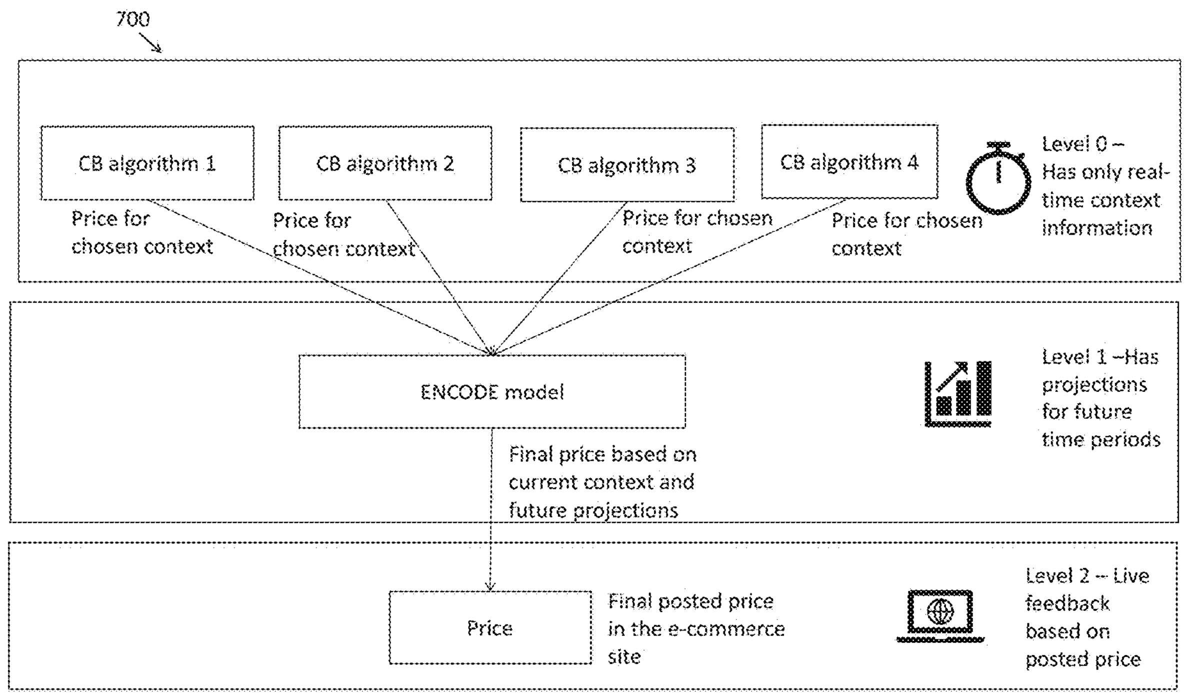
FIG. 7 is a block diagram to illustrate the ENCODE model, according to some embodiments of the present disclosure.

FIG. 7 is a block diagram 700 to illustrate ENCODE model, according to some embodiments of the present disclosure. Herein, to navigate these multifaceted challenges, an ensemble-based Contextual Bandit (CB) approach, known as ENCODE model (ENsemble of Contextual bandits for Dynamic pricing in E-commerce) is provided. The ENCODE model oversees the price recommendations of one or more CB models such as LinUCB, BayesUCB, Contextual Thompson Sampling and algorithms as part of VW library. Herein, an epsilon greedy and a Q-learning algorithms is employed for ensembling.

In general, the ENCODE model can consist of a portfolio of different RL/bandit models. CB model at level 0 has all the essential information pertaining to the context that is local to each model at the given time instant. The ENCODE model in level 1 has the information pertaining to the context at the given instant of time and the context for the future time intervals (decided by the batch size—an important hyperparameter) based on projections. Thus, the ENCODE model makes an informed decision about the price recommendations such that it is optimal both with respect to the current context and the projected context.

In one example, for an optimal price that maximizes margin not only at a given time but also for a certain period (typically 2-3 weeks) for stability and customer satisfaction, current context is modelled to contain information very local to the current week and the projected context to contain projections of context variables for the next 3 weeks. These projections (sales units, price points) are obtained from a set of ML and Deep Learning (DL) models trained on historical sales data. Once a price is selected by ENCODE, it is then set to level 2 (User interface) which can post this price on the e-commerce site to obtain feedback based on it.

The operationalizing CB models in real world scenarios requires careful selection of hyperparameters. The hyperparameters are tailored for different data sets, contributing to computational efficiency. Specifically, the framework harnessed historical sales data to initialize prior means and likelihood variances resulting in time saving compared to random initialization.

The distribution of rewards corresponding to different price points (arms in our case) are initialized with reward probabilities captured from historical sales data corresponding to the different products. The distribution of reward uncertainty modelled via the variance of the priors and the likelihood distribution were captured from historical sales corresponding to different products. (Use of prior means, variances, and likelihood variances from historical sales≈20% time saving as compared to random initialization of these parameters).

At the next step 314 of the processor-implemented method 300, the one or more hardware processors 108 are configured by the programmed instructions to compute an optimal price recommendation of each of the one or more CB models based on a predefined ensemble model. The ensemble model supervises the price recommendations from each of the one or more CB models. The ensemble model employs epsilon-greedy and Q-learning techniques, innovatively focusing on both immediate and future rewards, thereby ensuring optimal pricing. The ensemble model calculates a cumulative reward, and wherein the cumulative reward is a combination of a current reward and a future reward based on the price recommendation of each of the plurality of CB models.

It would be appreciated that a weight is assigned to each of the one or more CB models based on their historical performance and use these weights to aggregate the proposed prices. A meta-learning technique and a voting mechanism takes the proposed prices from each of the one or more CB models as input and predicts a final price based on stacked generalization and majority votes respectively.

Furthermore, a feedback loop is established to continuously monitor the performance of the ensemble approach and adjust the weights or voting mechanism as necessary to optimize performance.

The performance of the ensemble model is regularly evaluated using metrics such as revenue, sales volume, and customer satisfaction, and optimize the approach based on these evaluations. Alternatively, each of the one or more CB models are applied in a sequence rather than parallel. The outcome of one CB model serves as an input to the next CB model. Herein, a hierarchical model is created wherein one CB model operates at a higher level making broad pricing strategy decisions, and other operation at a lower level, fine-tuning these strategies. Instead of choosing one model over another, a posterior probability of each of the one or more CB model is computed given the data and then average over all the one or more CB models weighted by their posterior probability.

In one example, wherein the innovative superiority of the ensemble ENCODE model over individual models in the context of dynamic pricing, particularly using dataset 1 as a case study. The ENCODE model not only augments accuracy and performance but also mitigates risks associated with over-fitting and under-fitting by judiciously balancing bias-variance trade-offs. For new products, it is challenging to come up with optimal prices as these products do not have sufficient historical sales data. For example, consider a new electronic gadget which is an enhanced version of all its predecessors. In such cases, these products do not have very close substitutes whose selling characteristics could be leveraged. This is often referred to as one of the cold-start problems in pricing literature. The ENCODE model incorporates exploration of different price points both in the individual bandit algorithms as well as the ensemble model and thus, ingeniously addresses the so-called 'cold start' problem pricing new products without historical sales data.

Figure 8:
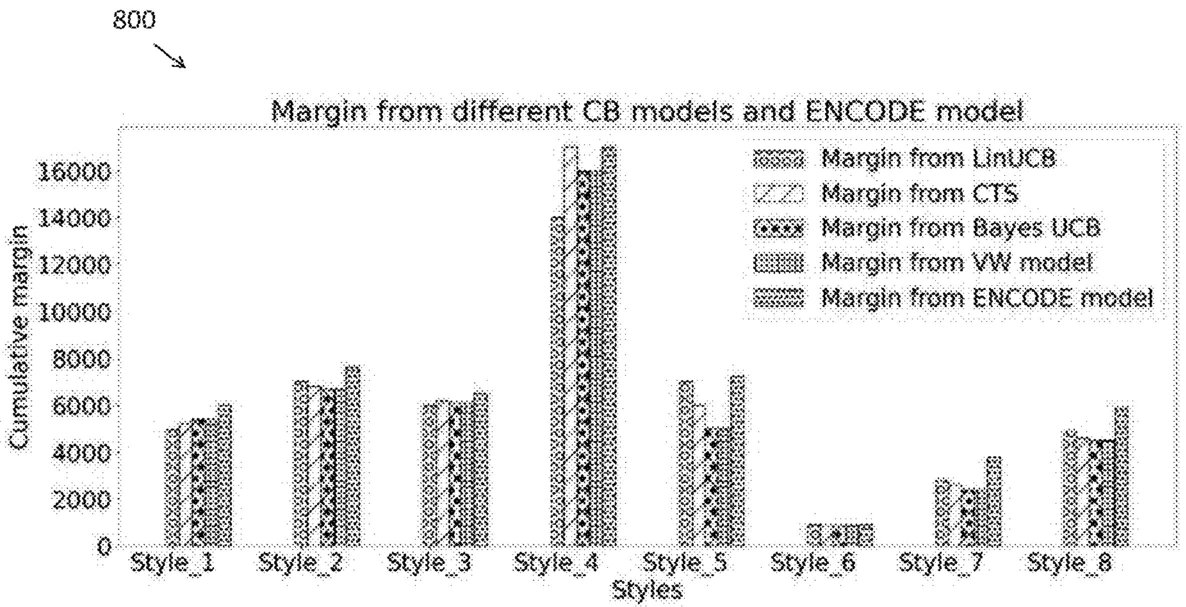
FIGS. 8 and 9 reveal that the ensemble model significantly outpaces individual bandit algorithms in achieving higher cumulative margins, according to some embodiments of the present disclosure.
Figure 9:
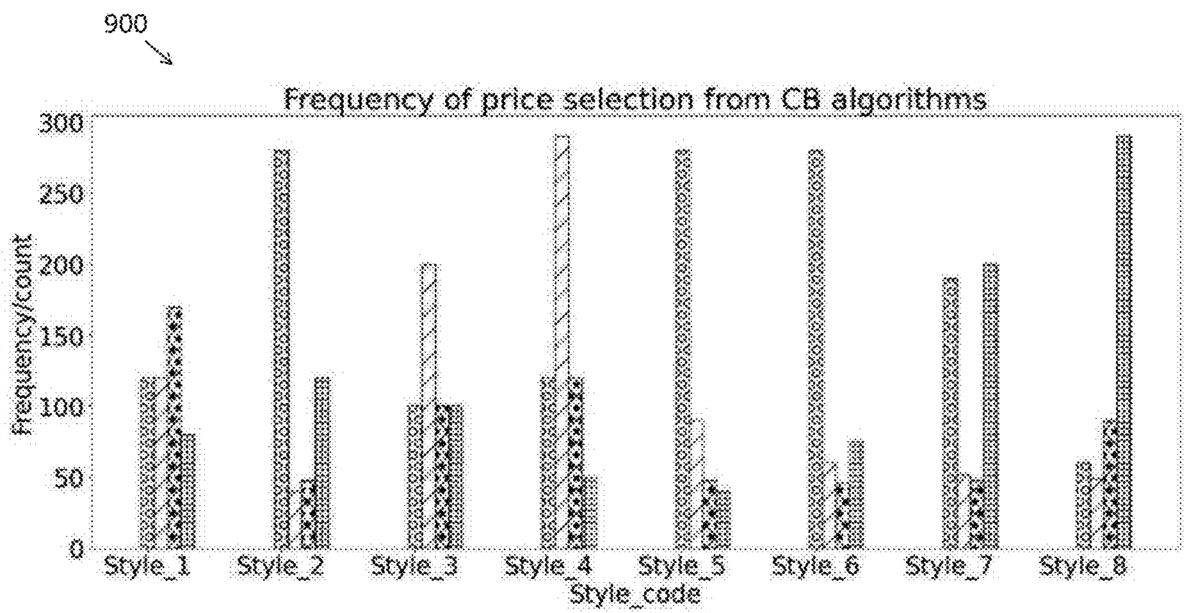

FIG. 8 is a schematic diagram 800 reveals that the ensemble model significantly outpaces individual bandit algorithms in achieving higher cumulative margins, according to some embodiments of the present disclosure. Specifically, for a subset of eight representative styles, the ensemble model delivers a 19% improvement in cumulative margin over individual models. This is further illustrated in FIG. 9, which depicts the frequency of price selection by the ensemble model across these styles. This way, the ensemble bandit model helped to replicate A/B testing of price recommendations in e-commerce. The ENCODE decides between price recommendations offered by different CB algorithms. If one of them is clearly less effective than the others, it will progressively reduce the number of times that price recommendation gets adopted.

Finally, at the next step 316 of the processor-implemented method 300, the one or more hardware processors 108 are configured by the programmed instructions to recommend at least one optimal price computed by on the predefined ensemble model. Herein, the predefined ensemble model has followed one or more ensemble strategies such as bootstrap aggregation techniques, boosting techniques and simple average techniques. In the Bootstrap aggregation techniques, the contextual bandits are trained on various subsets of the original data corresponding to the same product. And, with the boosting techniques, the price recommendations that lead to loss in financial goals are assigned higher weights in the subsequent iterations to boost up the learning. Further, in the simple averaging techniques, the final price recommendation is arrived based on computation of average over the price recommendations offered by the CB models.

In another embodiment, wherein the ensemble strategies assigning a weight to each of the one or more CB models based on predefined historical performance and using the assigned weights to aggregate prices, predicting a final price against proposed prices of each of the one or more CB models using a predefined advanced algorithmic learning technique and a voting mechanism and continuously monitoring performance of the ensemble model to adjust with ensemble approach to optimize performance. Once a final price is selected by ENCODE, it is posted on the e-commerce website to obtain live feedback. In addition to facilitating the retailer in modelling "what-if" scenarios, a scenario modeler engine generates different scenarios for different financial objectives and constraints set by the retailer. FIG. 2 describes the flow of inputs and the final output from the ENCODE model. Various price recommendations from contextual bandit algorithms in Level 0 flow into level 1. In Level 1, the ensemble model picks one price recommendation and then it flows to Level 2. In level 2, the price is then posted on the e-commerce site, and it made available in the user interface.

In another embodiment, the framework applicability extends to environments where competitors pricing exerts a significant influence on sales and pricing strategy, as was particularly evident in Dataset 1. Uniquely, the contextual bandit algorithms are enriched with competitor-sensitive features such as effective competitor price, price differential, and leakage ratio coefficients. Leakage ratio coefficients are obtained via a two-step regression. In the first step, all important features impacting sales of a product excluding the competitor prices are regressed against sales and the residuals are obtained. In the second step, the competitor prices are regressed against these residuals and the coefficients corresponding to the different competitor prices are called the leakage ratio coefficients. The model then dynamically adjusts sales units and margin calculations based on these metrics.

Figure 10:
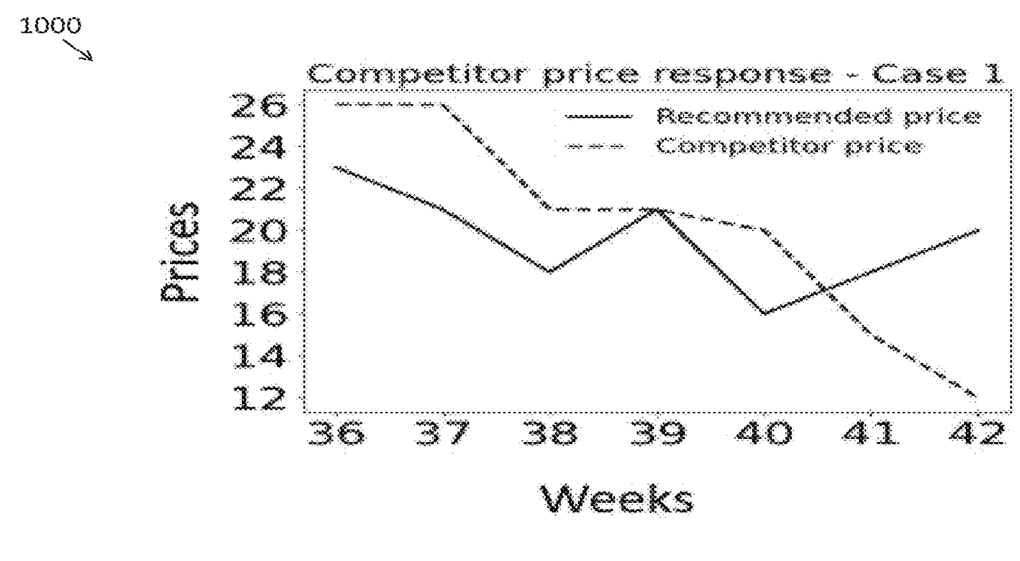
FIGS. 10 and 11 are schematic diagrams to illustrate insight into different competitive scenarios that the framework can adeptly navigate, according to some embodiments of the present disclosure.
Figure 11:
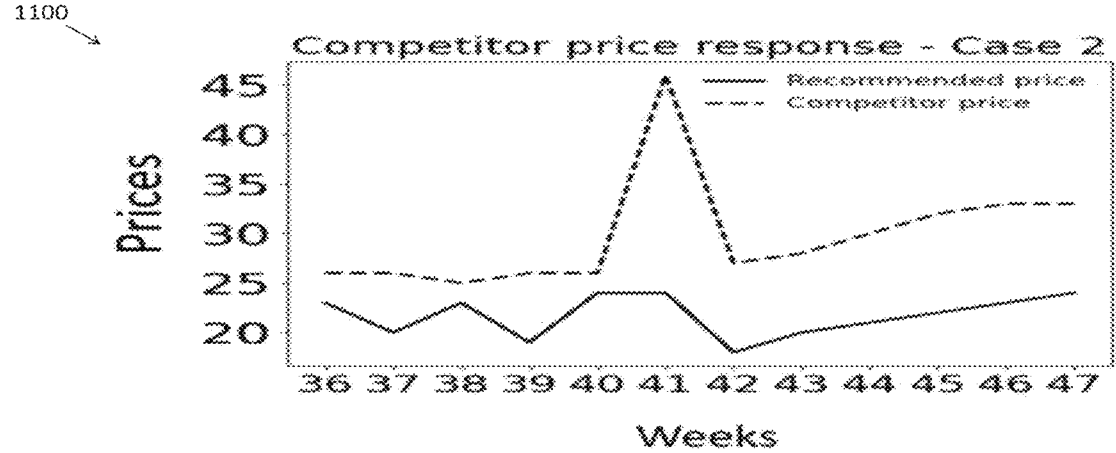

FIGS. 10 and 11 are schematic diagrams to illustrate insight into different competitive scenarios that the framework can adeptly navigate, according to some embodiments of the present disclosure. The system demonstrates the model's responsiveness to shifts in competitor pricing strategies over time, rather than adhering to a fixed strategy. A snapshot of this dynamic responsiveness is presented in Table 1.

TABLE 1

| Week number | Old Price | Old Sales | Old Margin | New Price | Competitior price (lagged) | New Sales | New Margin |
|---|---|---|---|---|---|---|---|
| 1 | 12.79 | 7 | 37.02 | 12.59 | 11.59 | 9 | 46 |
| 2 | 12.59 | 9 | 45.81 | 12.50 | 10.59 | 9 | 45 |
| 3 | 12.50 | 9 | 45.0 | 12.40 | 10.99 | 10 | 49 |
| 4 | 12.40 | 10 | 49 | 11.59 | 9.5 | 11 | 45 |
| 5 | 11.59 | 10 | 45 | 11.00 | 9.5 | 12 | 42 |
| 6 | 11.00 | 10 | 42 | 10.79 | 9.5 | 12 | 39 |
| 7 | 10.79 | 11 | 39 | 10.79 | 10.5 | 16 | 53 |

In another embodiment, to achieve a desired margin goal while maximizing other business objectives in conjunction, the framework introduces an additional margin constraint in the pricing formulation as shown in the equation—

$$\frac{s_{new,i}[t]*(P_{opt,i}[t]-cp_i)}{P_{opt,i}[t]*S_{new,i}[t]} >= m\ \% \quad (2)$$

wherein the new objective function incorporates the above constraint as a penalty and is defined as:

$$\text{Maximize } \alpha_1 * \text{Sales} + \alpha_2 * \text{Revenue} + \alpha_3 * \text{Margin} - \text{penalty} \quad (3)$$

$$\text{Maximize } \alpha_1 * S_{new,i}[t] + \alpha_2 * P_{opt,i}[t] * S_{new,i}[t] + \alpha_3 * S_{new,i}[t] * (P_{opt,i}[t] - cp_i) - p * \left(m - \frac{S_{new,i}[t] * (P_{opt,i}[t] - cp_i)}{P_{opt,i}[t] * S_{new,i}[t]}\right) \quad (4)$$

wherein, $P_{opt,i}[t]$ is the optimal price for the round t for the style i, $S_{new,i}[t]$ is the sales corresponding to optimal price for the round t for the style i, considering inter-item and competitor effects, $cp_i$ is the unit cost price of the style i, m is the minimum margin percentage for the style i, p is the penalty constant for margin reduction from minimum margin percentage, $\alpha_1$, $\alpha_2$, $\alpha_3$ are the weights for the Objective, i.e., margin and inventory reduction rate respectively, such that $\alpha_1+\alpha_2+\alpha_3=1$.

Figure 12:
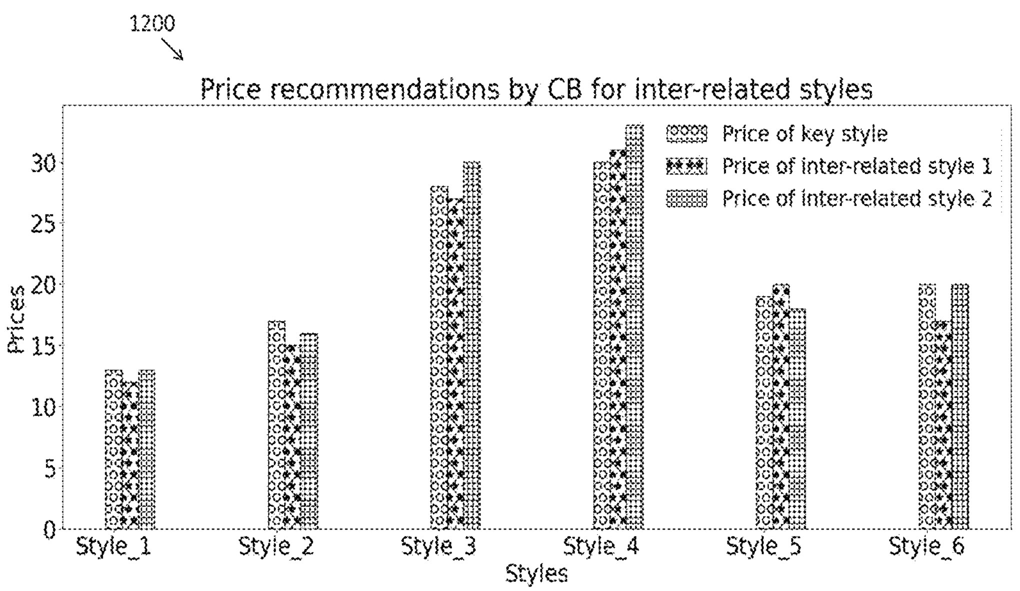
FIG. 12 is a schematic diagram to illustrate price recommendations by CB for inter-related styles, according to some embodiments of the present disclosure.

In another embodiment, the CB models also account for the complex dynamics between inter-related products, either as complements or substitutes. Incorporating these relationships as context features led to a 6% improvement in cumulative margin, as evidenced in Table 2 and shown in FIG. 12.

TABLE 2

| Dataset 1 | Cumulative Margin |
|---|---|
| Assuming styles are independent | 12286 |
| After consideration of inter-related styles | 19651 |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of [we complete based on challenges to be appended in the background section]. The framework provides a data sensitive and adaptive approach to dynamic pricing that not only enhances margins but also provides a strategic edge in the competitive markets. This is especially pertinent for new products and high competition settings, showcasing the models flexibility and adaptability to a wide array of retail scenarios.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method for dynamic pricing of one or more products in an e-commerce retail comprising:

receiving, via an input/output interface, an input data from two primary sources pertaining to a plurality of Stock Keeping Units (SKUs), wherein the input data from a first primary source is based on one or more historical transactions, an inventory, a price master, an online click stream, and one or more attributes of one or more customers and SKUs, and wherein the second primary source includes dynamics of the e-commerce landscape;

pre-processing, via one or more hardware processors, the received input data to obtain pre-processed input data, wherein the pre-processing includes removing one or more predefined outliers based on clipping technique, imputing missing values based on a moving average technique, and a dimensionality reduction based on principal component analysis and a combination of normalization and standardization techniques based on minimum and maximum value and one or more distribution characteristics of the input data;

aggregating, via the one or more hardware processors, the obtained pre-processed input data to a predefined level of granularity to get an aggregated data using a set of clustering and segmentation techniques;

enabling, via the one or more hardware processors, at least one of one or more triggers, wherein the one or more triggers include a competitor price distance beyond a predefined threshold, an inventory level below threshold, a predefined special event, holidays, one or more competitor products going out of stock and a change in an input cost beyond a predefined threshold;

obtaining, via the one or more hardware processors, a contextual data from the aggregated data based on the enabled one or more triggers for a price change, wherein the contextual data includes a plurality of contextual features comprising competitor price leakage ratio coefficients, cross price elasticity coefficients, customer clusters and seasonality indices;

training, via the one or more hardware processors, one or more Contextual Bandit (CB) models based on the plurality of contextual features with the enabled one or more triggers to obtain a price recommendation corresponding to each of the one or more CB models, wherein each of the one or more CB models are tweaked by employing an approximate inference including a variational inference or a Markov Chain Monte Carlo (MCMC) with samples to speed up inference, a caching of previously computed values, a model approximation and a sampling reduction to speed up computation of the CB model, wherein caching of the previously computed values includes posterior distributions for price points, thereby avoiding recomputing the computed values;

providing an Ensemble of Contextual bandits for dynamic pricing in the E-commerce retail (ENCODE) model with a portfolio of varied bandit models, wherein the CB model at a level 0 includes information pertaining to a context that is local to each CB model at a time instant, and the ENCODE model in a level 1 include information pertaining to the context at the time instant and the context for future time intervals in accordance with projections, wherein the ENCODE model makes an informed decision about the price recommendations that is optimal both with respect to a current context and a projected context and the ENCODE model adaptively navigates in varied competitive scenarios including shifts in competitor pricing strategies over time rather than adhering to a fixed strategy;

computing, via the one or more hardware processors, an optimal price recommendation of each of the one or more CB models based on a predefined ensemble model, wherein the predefined ensemble model calculates a cumulative reward, and wherein the cumulative reward is a combination of a current reward and a future reward corresponding to the time period until the next price change based on the price recommendation of each of the plurality of CB models; and recommending, via the one or more hardware processors, at least one optimal price computed by on the predefined ensemble model, wherein the predefined ensemble model following one or more ensemble strategies comprising a bootstrap aggregation technique, boosting technique, a simple average technique, predefined advanced algorithmic learning technique, and voting techniques wherein the one or more ensemble strategies comprising:

assigning a weight to each of the one or more CB models based on predefined historical performance and using the assigned weights to aggregate prices;

predicting a final price against proposed prices of each of the one or more CB models;

continuously monitoring performance of the ensemble model to adjust weight and voting mechanisms to optimize performance; and posting the final price on an e-commerce website upon selecting the final price by the ensemble model and obtaining live feedback in a user interface, wherein dynamic pricing of products in the e-commerce website establishes closed-loop feedback to continuously monitor performance of the ensemble model and adjust the weight and the voting mechanisms to optimize performance of the ensemble model, transitioning varied price recommendations from multiple CB algorithms in the level 0 into level 1, and in the level 1, the ensemble model selects a price recommendation and then flows to the level 2, and in the level 2, the price is posted on the e-commerce website, and made available in the user interface, wherein the ENCODE decides between price recommendations offered by multiple CB algorithms and progressively reduces number of times that the price recommendation is adopted.

2. The processor-implemented method of claim 1, wherein the dynamics of the e-commerce landscape comprises competitor prices, competitor out of stock (OOS) indicator, weather data, and external trends.

3. The processor-implemented method of claim 1, wherein cross price elasticity coefficients computation comprises:

selecting a key SKU among a plurality of SKUs by a user;

identifying, via a K-Nearest Neighbours (KNN) model, one or more SKUs among the plurality of SKUs which are mapping to the selected key SKU;

identifying, via a market basket analyser, co-bought product based on one or more association rule mining techniques, in the identified plurality of top SKUs; and performing regression against sales of the key SKUs based on prices of related products identified via the KNN model and the market basket analysis technique.

4. The processor-implemented method of claim 1, wherein transaction data is used to calculate leakage ratio coefficients corresponding to one or more competitor prices through a two-step regression:

firstly, all features affecting sales except the competitor price are regressed against sales and the residuals are captured; and secondly, the competitor prices are regressed against the residuals and the corresponding coefficients for each competitor price are taken as competitor leakage ratios.

5. The processor-implemented method of claim 1, wherein new sales is calculated based on computed leakage ratio coefficients and cross price elasticity coefficients.

$$\text{Sales} = S_{new,i}[t] = S_{pred,i}[t] * \frac{\prod_j \left(\frac{P_{opt,j}[t]}{P_{init,j}}\right)^{-\gamma_{ij}}}{\exp\left(lr_i * \frac{P_{opt,i}[t] - P_{comp,i}[t]}{P_{comp,i}[t]}\right)}$$

wherein, i∈style, j∈inter-related style, $S_{new,i}[t]$ sales corresponding to optimal price for round 't' for the style 'i', considering inter-item and competitor effects;

$S_{pred,i}[t]$ cross-price elasticity between style 'i' and style 'j';

$P_{opt,i}[t]$ optimal price for round 't' for the style 'i';

$P_{init,i}[t]$ initial/previously updated price forecast style 'i';

$P_{comp,i}[t]$ competitor price for round 't' for the style 'i'.

6. The processor-implemented method of claim 1, wherein identifying, via a K-Means clustering method, one or more clusters of one or more customers based on one or more customer attributes data.

7. The processor-implemented method of claim 1, wherein the plurality of CB models comprises at least one of Linear Upper Confidence Bound (LinUCB) algorithm, Bayesian Upper Confidence Bound (BayesUCB) Algorithm, Contextual Thompson Sampling (CTS) Algorithm, and Vowpal Wabbit (VW) algorithm.

8. The processor-implemented method of claim 1, wherein training each of the plurality of CB models comprises:

receiving a plurality of contextual features with at least one of one or more enable triggers, predefined demand forecasts, price elasticity, and the plurality of SKUs;

setting discrete prices for the SKUs between a predefined price range minimum and a predefined maximum price range;

$$\text{Maximize Yield} = \alpha_1 * \text{Sales} + \alpha_2 * \text{Revenue} + \alpha_3 * \text{Margin}$$

wherein $\alpha_1$, $\alpha_2$, $\alpha_3$ weights for the objective, i.e., sales, revenue, and margin such that $\alpha_1+\alpha_2+\alpha_3=1$.

calculating a reward function based on a yield equation (a weighted combination of sales, revenue, and margin);

selecting a price arm (maximum and minimum price range) iteratively by an exploration and exploitation strategy of the CB models;

obtaining sales corresponding to the chosen price arm;

calculating a yield based on the chosen price; and updating function of the CB model based on the yield obtained for the selected price arm.

9. The processor-implemented method of claim 1, wherein obtaining an optimal price recommendation, via the ensemble strategies, from the calculated cumulative reward corresponding to the price recommendation of each of the plurality of CB models.

$$\text{Cumulative reward} = \text{Yield} + \sum_{n=1}^{T} \gamma^n * \text{reward}(t+n).$$

10. A system for dynamic pricing of one or more products in an e-commerce retail comprising:

a memory storing instructions;

one or more Input/Output (I/O) interfaces; and one or more hardware processors coupled to the memory via the one or more I/O interfaces, wherein the one or more hardware processors are configured by the instructions to:

receive an input data from two primary sources pertaining to a plurality of Stock Keeping Units (SKUs), wherein the input data from a first primary source is based on one or more historical transactions, an inventory, a price master, an online click stream, and one or more attributes of one or more customers, and wherein the second primary source includes dynamics of the e-commerce landscape;

pre-process the received input data to obtain pre-processed input data, wherein the pre-processing includes removing one or more predefined outliers based on clipping technique, imputing missing values based on a moving average technique, and a dimensionality reduction based on principal component analysis and a combination of normalization and standardization techniques based on minimum and maximum value and one or more distribution characteristics of the input data;

aggregate the obtained pre-processed input data to a predefined level of granularity to get an aggregated data using a set of clustering and segmentation techniques;

enable at least one of one or more triggers, wherein the one or more triggers include a competitor price distance beyond a predefined threshold, an inventory level below threshold, a predefined special event, holidays, one or more competitor products go out of stock and a change in an input cost beyond a predefined threshold;

obtain a contextual data from the aggregated data based on the enabled one or more triggers for a price change, wherein the contextual data includes a plurality of contextual features comprising competitor price leakage ratio coefficients, cross price elasticity coefficients, customer clusters and seasonality indices;

train one or more Contextual Bandit (CB) models based on the plurality of contextual features with the enabled one or more triggers to obtain a price recommendation corresponding to each of the one or more CB models—wherein each of the one or more CB models are tweaked by employing an approximate inference including a variational inference or a Markov Chain Monte Carlo (MCMC) with samples to speed up inference, a caching of previously computed values, a model approximation, and a sampling reduction to speed up computation of the CB model, wherein caching of the previously computed values includes posterior distributions for price points, thereby avoiding recomputing the computed values;

provide an Ensemble of Contextual bandits for dynamic pricing in the E-commerce retail (ENCODE) model with a portfolio of varied bandit models, wherein the CB model at a level 0 includes information pertaining to a context that is local to each CB model at a time instant, and the ENCODE model in a level 1 include information pertaining to the context at the time instant and the context for future time intervals in accordance with projections, wherein the ENCODE model makes an informed decision about the price recommendations that is optimal both with respect to a current context and a projected context and the ENCODE model adaptively navigates in varied competitive scenarios including shifts in competitor pricing strategies over time rather than adhering to a fixed strategy;

compute an optimal price recommendation of each of the one or more CB models based on a predefined ensemble model, wherein the predefined ensemble model calculates a cumulative reward, and wherein the cumulative reward is a combination of a current reward and a future reward corresponding to the time period until the next price change based on the price recommendation of each of the plurality of CB models; and recommend at least one optimal price computed by on the predefined ensemble model, wherein the predefined ensemble model following one or more ensemble strategies comprising a bootstrap aggregation technique, boosting technique and a simple average technique, wherein the one or more ensemble strategies comprising:

assigning a weight to each of the one or more CB models based on predefined historical performance and using the assigned weights to aggregate prices;

predict a final price against proposed prices of each of the one or more CB models using an advanced algorithmic learning technique and a voting mechanism;

continuously monitoring performance of the ensemble model to adjust ensemble approach to optimize performance; and posting the final price on an e-commerce website upon selecting the final price by the ensemble model and obtaining live feedback in a user interface, wherein dynamic pricing of products in the e-commerce website establishes closed-loop feedback to continuously monitor performance of the ensemble model and adjust the weight and the voting mechanisms to optimize performance of the ensemble model, transition varied price recommendations from multiple CB algorithms in the level 0 into level 1, and in the level 1, the ensemble model selects a price recommendation and then flows to the level 2, and in the level 2, the price is posted on the e-commerce website. and made available in the user interface, wherein the ENCODE decides between price recommendations offered by multiple CB algorithms and progressively reduces number of times that the price recommendation is adopted.

11. The system of claim 10, wherein the dynamics of the e-commerce landscape comprises competitor prices, competitor out of stock (OOS) indicator, weather data, and external trends.

12. The system of claim 10, wherein cross price elasticity coefficients computation comprises;

selecting a key SKU among a plurality of SKUs by a user;

identifying, via a K-Nearest Neighbors (KNN) model, one or more SKUs among the plurality of SKUs which are mapping to the selected key SKU;

identifying, via a market basket analyser, co-bought product based on one or more association rule mining techniques, in the identified plurality of top SKUs; and performing regression against sales of the key SKUs based on prices of related products identified via the KNN model and the market basket analysis technique.

13. The system of claim 10, wherein transaction data is used to calculate leakage ratio coefficients corresponding to one or more competitor prices through a two-step regression:

firstly, all features affecting sales except the competitor price are regressed against sales and the residuals are captured; and secondly, the competitor prices are regressed against the residuals and the corresponding coefficients for each competitor price are taken as competitor leakage ratios.

14. The system of claim 10, wherein new sales are calculated based on computed leakage ratio coefficients and cross price elasticity coefficients.

$$\text{Sales} = S_{new,i}[t] = S_{pred,i}[t] * \frac{\prod_j \left(\frac{P_{opt,j}[t]}{P_{init,j}}\right)^{-\gamma_{ij}}}{\exp\left(lr_i * \frac{P_{opt,i}[t] - P_{comp,i}[t]}{P_{comp,i}[t]}\right)}$$

wherein, i∈style, j∈inter-related style, $S_{new,i}[t]$ sales corresponding to optimal price for round 't' for the style 'i', considering inter-item and competitor effects;

$S_{pred,i}[t]$ cross-price elasticity between style 'i' and style 'j';

$P_{opt,i}[t]$ optimal price for round 't' for the style 'i';

$P_{init,i}[t]$ initial/previously updated price forecast style 'i';

$P_{comp,i}[t]$ competitor price for round 't' for the style 'i'.

15. The system of claim 10, wherein identifying, via a K-Means clustering technique, one or more clusters of one or more customers based on one or more customer attributes data.

16. The system of claim 10, wherein the plurality of CB models comprises at least one of Linear Upper Confidence Bound (LinUCB) algorithm, Bayesian Upper Confidence Bound (BayesUCB) Algorithm, Contextual Thompson Sampling (CTS) Algorithm, and Vowpal Wabbit (VW) algorithm.

17. The system of claim 10, wherein training each of the plurality of CB models comprises:

receiving a plurality of contextual features with at least one of one or more enable triggers, predefined demand forecasts, price elasticity, and the plurality of SKUs;

setting discrete prices for the SKUs between a predefined price range minimum and a predefined maximum price range;

calculating a reward function based on a yield equation (a weighted combination of sales, revenue, and margin);

$$\text{Maximize Yield} = \alpha_1 * \text{Sales} + \alpha_2 * \text{Revenue} + \alpha_3 * \text{Margin}$$

wherein $\alpha_1$, $\alpha_2$, $\alpha_3$ weights for the objective, i.e., sales, revenue, and margin such that $\alpha_1+\alpha_2+\alpha_3=1$, selecting a price arm (maximum and minimum price range) iteratively by an exploration and exploitation strategy of the CB models;

obtaining sales corresponding to the chosen price arm;

calculating a yield based on the selected price arm; and updating, reward function of the CB model based on the yield obtained for the selected price arm.

18. The system of claim 10, wherein obtaining an optimal price recommendation, via the ensemble strategies, from the calculated cumulative reward corresponding to the price recommendation of each of the plurality of CB models:

$$\text{Cumulative reward} = \text{Yield} + \sum_{n=1}^{T} \gamma^{n} * \text{reward}(t+n).$$

19. One or more non-transitory machine-readable information storage mediums comprising one or more instructions which when executed by one or more hardware processors cause:

receiving, via an input/output interface, an input data from two primary sources pertaining to a plurality of Stock Keeping Units (SKUs), wherein the input data from a first primary source is based on one or more historical transactions, an inventory, a price master, an online click stream, and one or more attributes of one or more customers and SKUs, and wherein the second primary source includes dynamics of the e-commerce landscape;

pre-processing the received input data to obtain pre-processed input data, wherein the pre-processing includes removing one or more predefined outliers based on clipping technique, imputing missing values based on a moving average technique, and a dimensionality reduction based on principal component analysis and a combination of normalization and standardization techniques based on minimum and maximum value and one or more distribution characteristics of the input data;

aggregating the obtained pre-processed input data to a predefined level of granularity to get an aggregated data using a set of clustering and segmentation techniques;

enabling at least one of one or more triggers, wherein the one or more triggers include a competitor price distance beyond a predefined threshold, an inventory level below threshold, a predefined special event, holidays, one or more competitor products going out of stock and a change in an input cost beyond a predefined threshold;

obtaining a contextual data from the aggregated data based on the enabled one or more triggers for a price change, wherein the contextual data includes a plurality of contextual features comprising competitor price leakage ratio coefficients, cross price elasticity coefficients, customer clusters and seasonality indices;

training one or more Contextual Bandit (CB) models based on the plurality of contextual features with the enabled one or more triggers to obtain a price recommendation corresponding to each of the one or more CB models wherein each of the one or more CB models are tweaked by employing an approximate inference including a variational inference or a Markov Chain Monte Carlo (MCMC) with samples to speed up inference, a caching of previously computed values, a model approximation and a sampling reduction to speed up computation of the CB model, wherein caching of the previously computed values includes posterior distributions for price points, thereby avoiding recomputing the computed values;

providing an Ensemble of Contextual bandits for dynamic pricing in the E-commerce retail (ENCODE) model with a portfolio of varied bandit models, wherein the CB model at a level 0 includes information pertaining to a context that is local to each CB model at a time instant, and the ENCODE model in a level 1 include information pertaining to the context at the time instant and the context for future time intervals in accordance with projections, wherein the ENCODE model makes an informed decision about the price recommendations that is optimal both with respect to a current context and a projected context and the ENCODE model adaptively navigates in varied competitive scenarios including shifts in competitor pricing strategies over time rather than adhering to a fixed strategy;

computing an optimal price recommendation of each of the one or more CB models based on a predefined ensemble model, wherein the predefined ensemble model calculates a cumulative reward, and wherein the cumulative reward is a combination of a current reward and a future reward corresponding to the time period until the next price change based on the price recommendation of each of the plurality of CB models; and recommending at least one optimal price computed by on the predefined ensemble model, wherein the predefined ensemble model following one or more ensemble strategies comprising a bootstrap aggregation technique, boosting technique, a simple average technique, predefined advanced algorithmic learning technique, and voting techniques wherein the one or more ensemble strategies comprising:

assigning a weight to each of the one or more CB models based on predefined historical performance and using the assigned weights to aggregate prices;

predicting a final price against proposed prices of each of the one or more CB models;

continuously monitoring performance of the ensemble model to adjust weight and voting mechanisms to optimize performance; and posting the final price on an e-commerce website upon selecting the final price by the ensemble model and obtaining live feedback in a user interface, wherein dynamic pricing of products in the e-commerce website establishes closed-loop feedback to continuously monitor performance of the ensemble model and adjust the weight and the voting mechanisms to optimize performance of the ensemble model, transitioning varied price recommendations from multiple CB algorithms in the level 0 into level 1, and in the level 1, the ensemble model selects a price recommendation and then flows to the level 2, and in the level 2, the price is posted on the e-commerce website, and made available in the user interface, wherein the ENCODE decides between price recommendations offered by multiple CB algorithms and progressively reduces number of times that the price recommendation is adopted.

20. The one or more non-transitory machine-readable information storage mediums of claim 19, wherein cross price elasticity coefficients computation comprises:

selecting a key SKU among a plurality of SKUs by a user;

identifying, via a K-Nearest Neighbours (KNN) model, one or more SKUs among the plurality of SKUs which are mapping to the selected key SKU;

identifying, via a market basket analyser, co-bought product based on one or more association rule mining techniques, in the identified plurality of top SKUs; and performing regression against sales of the key SKUs based on prices of related products identified via the KNN model and the market basket analysis technique.

* * * * *